Aug. 9, 1938.  R. ERBAN  2,125,999
TRANSMISSION
Filed May 18, 1937  3 Sheets-Sheet 1
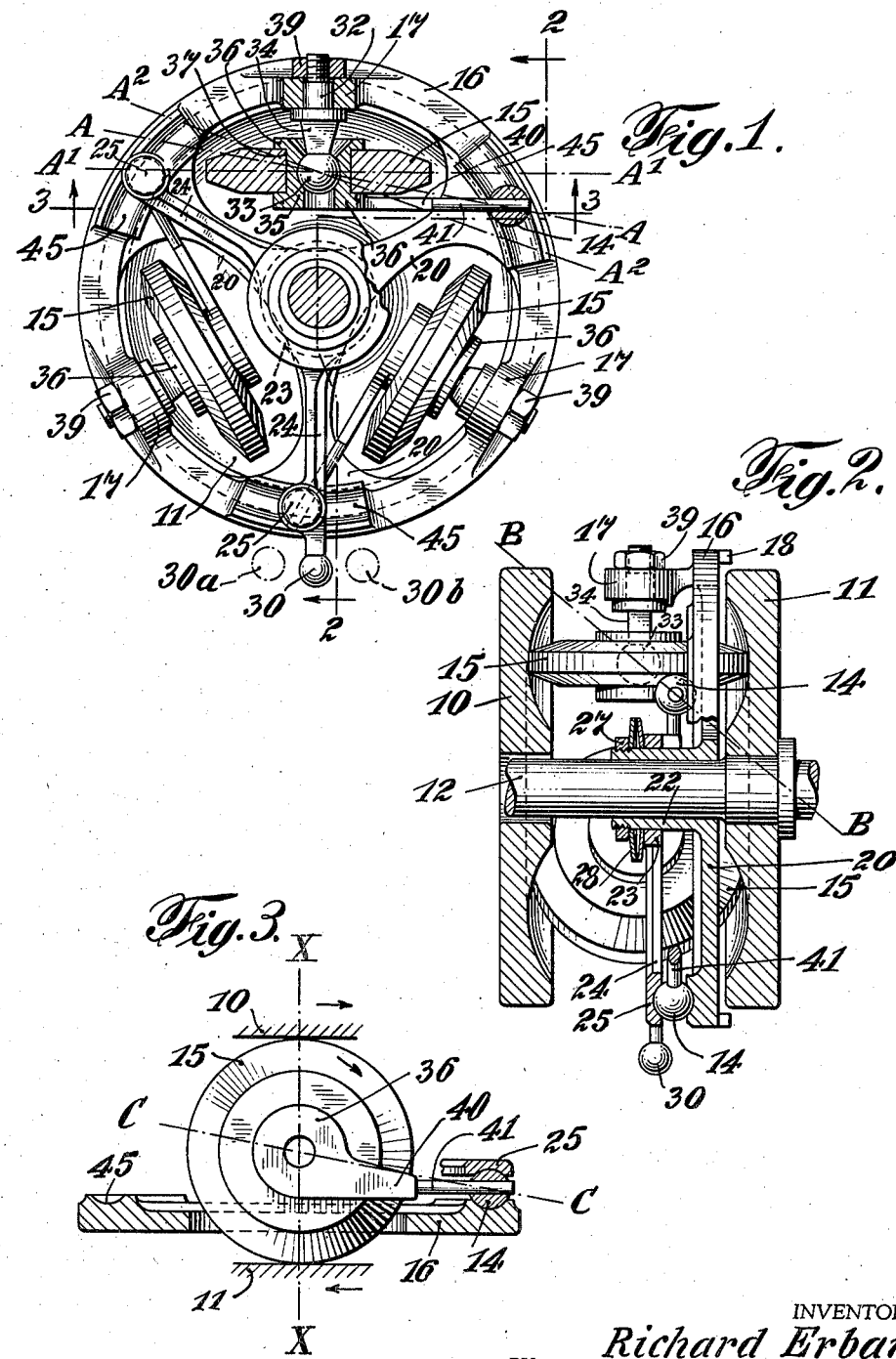
INVENTOR.
Richard Erban
BY Ramsey, Kent, Chisholm, + Lutz
his ATTORNEYS Aug. 9, 1938.    R. ERBAN    2,125,999
TRANSMISSION
Filed May 18, 1937    3 Sheets-Sheet 2

INVENTOR.
Richard Erban
BY Ramsey, Kent, Chisholm & Lutz
his ATTORNEYS

Aug. 9, 1938.   R. ERBAN   2,125,999
TRANSMISSION
Filed May 18, 1937   3 Sheets-Sheet 3

INVENTOR.
Richard Erban
BY Ramsey, Kent, Chisholm + Lutz
his ATTORNEYS

Patented Aug. 9, 1938

2,125,999

UNITED STATES PATENT OFFICE 2,125,999

TRANSMISSION

Richard Erban, New York, N. Y.

Application May 18, 1937, Serial No. 143,252
In Great Britain September 23, 1935

14 Claims. (Cl. 74—200)

This invention comprises improvements in or relating to friction transmission mechanisms. More particularly the invention relates to mechanisms of the type (shown for example in my U. S. Patent 1,750,167) in which transmission rollers are interposed between opposed races running in opposite directions. In such mechanisms the races are often of toric shape; and variations of speed ratio are obtained by so tilting the rollers that the radii of the tracks of the rollers on the races are varied.

In transmissions of this type, tilting of a roller cannot readily be brought about by applying direct tilting force to the roller mounting, because the roller tends to maintain itself tangent to its circular track on the race. Also, direct transverse tilting movement of the roller could only be effected by causing its periphery to slide sidewise on the races; and since the roller is under the considerable pressure necessary to permit a substantial torque to be transmitted from one race to the other, too great a force would be required to effect such sliding movement. For these reasons, various means have been provided for "twisting" the roller, i. e., pivotally moving the journals of the roller (or otherwise imparting an equivalent movement to the roller) about an axis passing through the contact points of the roller with the races, whereupon the roller moves on the bias to a new radial position on each of the races. Some prior patents have referred to this initial movement which is imparted to the roller as "inclination," but I herein use the term "twisting" to distinguish from various other inclinations which are involved in the apparatus. For convenience in discussing this action of the roller, we may consider (a) that the roller has a "main axis of rotation" (in its journals), about which the roller rotates as it drives one race in response to motion of the other race, and (b) that the journals of the roller have (in effect, at least) a "twisting axis" about which the journals, for example, (and hence the roller) are "twisted" to initiate a change of speed ratio. This twisting axis passes through the contact points of the roller on the two races. Additionally, means must be provided to place the roller in a tangential position on a new track to which the roller is moved in making a change of speed ratio. Theoretically, at least, this could be done by restoring the roller to a tangential position after it had completed its bias movement from the old track to the new track. However, it is desirable to so arrange the structure that as the roller approaches the new track, it will swing toward tangential position and reach the tangential position as the new track is reached. Such a feature imparts stability to the roller, which prevents the roller from fluctuating from tangential position during the normal operation of the transmission. Such stability is obtained by incorporating (in effect, at least) in the roller mounting a third axis, which will be referred to as a "rocking axis". In operation the roller is movable about this axis to stabilize itself in a manner which will be discussed later.

In said U. S. Patent 1,750,167, the rocking axis lies in the plane of the roller and is perpendicular to the main axis of rotation of the roller. Additionally the rocking axis is inclined by an angle of advance relative to the twisting axis. When a change of speed ratio is to be effected, the roller is twisted on the twisting axis. This temporarily destroys the equilibrium of the roller so that it starts moving on the bias toward the new track on the race. As the new track is approached reverse "twisting" of the roller automatically takes place to restore the roller to tangential position. In effect, this reverse "twisting" is a pivotal movement about an instantaneous line which passes through the contact points of the roller on the two races; but it is achieved by separate movements of the roller on its two perpendicular axes (the main axis and the rocking axis), which separate movements kinematically combine to produce the reverse "twisting".

The above described restoring action bears a certain general resemblance to the stabilization of the suspension of the front wheel of a bicycle in rolling over the ground. The fork of the bicycle, which is attached to the wheel axle, can be turned upon an axis which is inclined by an angle of advance relative to that diameter of the front wheel which passes through the contact point with the ground. As is well known, the bicycle wheel is stable in tending to maintain itself in a forward direction, but turning the fork on the inclined axis results in a new direction of travel being assumed. In this imperfect analogy, the road surface corresponds with the surface of the driving toric race of the friction transmission.

It is necessary in a roller type friction transmission that the mounting of each roller be stable in the sense above described. If the roller mounting be unstable, it will result in "shimmying" or "hunting" of the roller, which is capable of leading to very large, and indeed almost uncontrollable, wrenching forces upon the mechanism. Thus it is desirable that the roller mounting be stable in maintaining its running position in a plane tangential to its track on the races; and this is true even in a transmission in which rollers are not intended to be shifted to provide a change of ratio.

A general object of the present invention is to provide an improved roller transmission of the type above discussed.

Another object of the invention is to provide such a transmission having a structure which lends itself to manufacture assembly and adjustment on a quantity production basis.

Other objects of the invention are to reduce the cost of roller transmissions of the type referred to and to provide a structure which is not unduly sensitive to manufacturing variations in the sizes and adjustment of parts.

I have found that in transmissions of the type discussed, the roller will be stable if the roller mounting requires the roller to always be so positioned that its central plane will cut the tangent plane of its contact point with the race along a line which, upon swinging of the roller, will move about an instantaneous center lying on the approach side of the contact point. By "approach side" is meant the side on which the race is approaching the contact point.

Of course, there are two races; and this condition should preferably be maintained as to both races. If the condition is fulfilled as to only one race, there must be sufficient stability in connection with that race to more than offset any instability in connection with the other race.

The requirement for stability does not call for a fixed center of movement of the contact line of said two intersecting planes, but only for a center which does not move over to the non-approach side of the contact point between the race and the roller. This makes it possible to have a wider variety of specific roller mounting that will be stable; and examples of the best forms now known to me are disclosed herein.

Figure 1 is a view, partly in elevation and partly in section, showing the rollers, one race, and associated parts of one embodiment of the invention. In part the view is diagrammatic.

Figure 2 is a section, taken in general on the line 2—2 of Figure 1, and showing both races.

Figure 3 is a partly diagrammatic detail view, showing one roller and its adjustment means.

Figure 4:
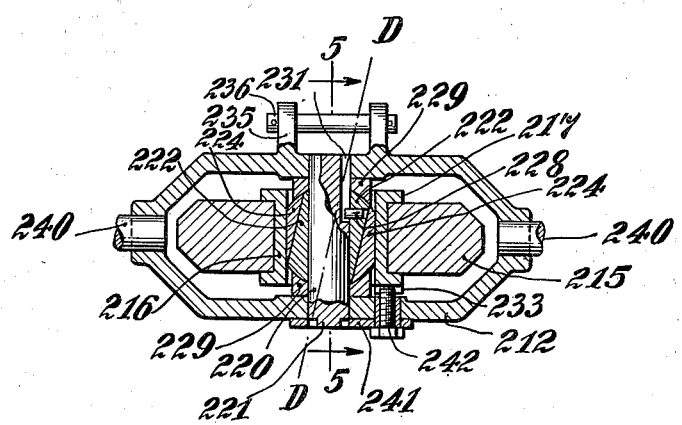
Figure 4 illustrates a second form of the invention, and is a section through one roller and its mounting.

Referring to Figures 1, 2, and 3, a spider, or carrier 16 has radial arms 20 (three shown) and a hub 22. Rotatably mounted in the hub is a shaft 12, which carries an attached race 11. Another race 10 is mounted coaxially with the race 11 and rotatable relatively thereto. Interposed between the races are three rollers 15, which serve to transmit power between the races. A device for generating the axial pressure to insure adhesional contact between the rollers and races is to be used, but is not shown, since such a device is well known in itself and no showing of it is necessary in order to explain the function of this present invention.

The rim of the spider 16 is provided with three lugs 17 which are spaced at 120° and serve as a base for the ball-pivots 33 carried on posts 34 having stems 32 which pass through the lugs 17. These stems are fastened by the nuts 39.

Mounted upon the ball 33 is a bearing-element or journal 35 movable in every direction to a limited extent, and on which the roller 15 is rotatably mounted. This ball-joint permits a tilting movement of the journal and roller upon it of about 30° to both sides of the middle position (as indicated by line B—B, Figure 2), whereas in the direction that is perpendicular to the tilting, it will permit an angling of about 10° to each side from the middle position. The middle position is shown in Figure 1.

The roller is rotatable upon a diagrammatically illustrated journal 36, and this bearing may be constructed in any preferred manner. It may be a ball or roller bearing or a plain bushing as shown in the drawings; and if a bushing, it may have an anti-friction coating at 37. Shoulders 36—36 are provided on both sides so as to keep the center of the roller in the center of the toroidal profile of the races, or, in other words to keep the center of the roller coincident with the center of the ball 33.

The shoulder 36 located on the inner side of the roller has an extension 40, upon which is fastened a pin 41. This pin slidably pierces a ball 14. The rim of the spider 16 is formed in three places into a circular groove 45 coaxial with the spider, and these grooves are spaced at about 120°. The grooves 45 have a cross section which corresponds to the balls 14, so that the balls can be guided by these grooves. A control member, consisting of a hub 23 carrying three arms 24 (two shown) is rotatably mounted upon the hub 22 of the spider. Each arm of the control member ends in a spherical cup 25, which corresponds to a ball 14 and presses the ball against the groove 45 of the spider 16. One of the arms 24 is provided with a ball-end 30, which is jointed to a control rod not shown and serves to move the control member over a limited arc, as indicated in dot-dash lines at 30a and 30b in Figure 1.

The control member 23—24 is yieldably pressed against the balls 14 by a spring 28, adjustable by a nut 27. It follows from the above description, that the three balls 14 will be accurately and equally spaced, if the spherical cups 25 are accurately spaced, and that the balls will keep this position with respect to each other while the control member 23—24 is operated. An inspection of Figure 1 shows that each ball 14 establishes a non-floating point through which the axis of pin 41 must pass. The pin 41 is fastened through extension 40 to the roller journal 35, which is movable about a fixed geometrical center, i. e. the center of the ball 33. Therefore, the element 35—36—40 is free to rotate about an axis A—A, Figure 1, which is determined by the said two centers, viz., the centers of the balls 33 and 14. This axis is seen from a different point of view at C—C Figure 3. It is obvious that this axis is inclined with respect to the plane of rotation of the roller, and an inspection of Figure 3 shows, that this axis is also inclined with respect to the diameter X—X passing through the contact points of the roller with the races 10—11. Additionally, this axis is such that no change in position of it is produced by the bias movement of the roller to a new track on the race.

An inspection of Figure 1 will show further, that a movement of the control element 23—24 by shifting ball 30, for example by moving this latter to position 30a, will cause a movement of the balls 14 in a clockwise direction and also cause the inclined axis to move from the position A—A to the position A2—A2. Vice versa, a movement of the control member 30 to position 30b will cause a movement of the inclined axis from A—A to A1—A1. The rollers will be "twisted" accordingly, being turned on the axis X—X.

Due to this "twisting", the plane of rotation of each roller will be changed from a tangent to its circular track about shaft 12; and the race-contacting points of the roller will make a bias movement inwardly or outwardly under the influence of the rotation of the races. If the point instantaneously in contact with race 10 moves out, the point instantaneously in contact with race 11 moves in; and vice versa. Due to the "angle of advance" of the axis A—A with respect to axis X—X, the tilting movement of the roller will progressively diminish the angle which the plane of the roller forms with a tangent to a circle on the race surface until this angle is zero and the roller has reached again a position of equilibrium. For the inclination shown in the drawings, the proper direction of rotation of that race which is supposed to lie behind the plane of the paper in Figure 1 is counterclockwise. This makes the roller shown in Figure 3 rotate in a clockwise direction. For an opposite direction of rotation, the angle which the axis C—C forms with the axis X—X would have to be reversed, so that the axis C—C would converge toward the spider 16 on the left side of the roller 15, while the angle between the axis A—A and the plane of the roller (shown in Figure 1) could remain unchanged.

It is obvious from an inspection of Figures 1, 2 and 3 that the form of the invention shown permits a very simple form of control-elements and a minimum of such parts, so that the possibilities of difficulties through manufacturing inaccuracies are limited to only a few parts. Moreover, these parts are of simple design, and can be easily checked. Furthermore, the contacting surfaces of all joints are large, so that little wear will occur. Lastly, it will be observed, that my design as shown in Figures 1–3 automatically eliminates all back-lash in the control movement, with the possible exception of the ball 14 upon the pin 41. This can be held to practically zero, because of the long guiding surface between the pin and the ball, while all possible play between the balls 14 and the arms of the control member 23—24 is taken up by the spring 28. The construction described insures for the reasons set forth a very accurate alignment of the rollers, or in other words, a very small difference between the transmission-ratios of the individual rollers, and the maintenance of this accurate alignment under working conditions.

Figure 6:
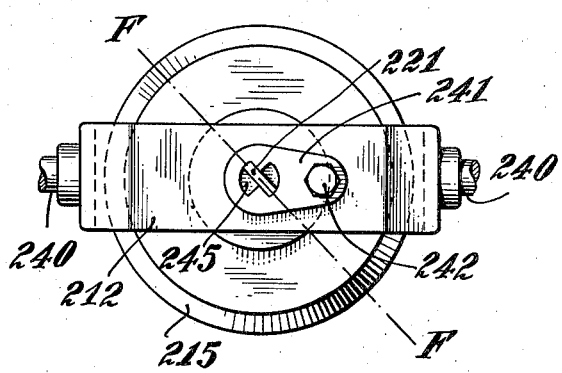
Figure 6 shows the structure of Figure 4 as viewed from the bottom of Figure 4.
Figure 5:
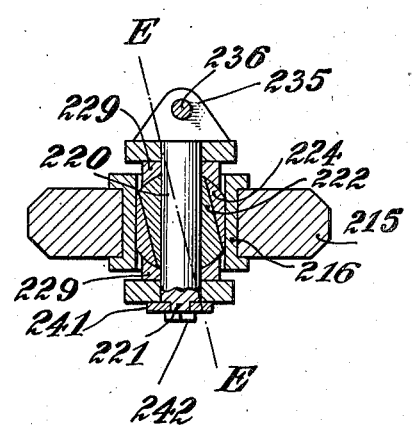
Figure 5 is a section taken in general on the line 5—5 of Figure 4.

The Figures 4–6 show an embodiment of the invention with a roller mounted in a conventional tiltable frame. For the sake of clarity only one roller and associated parts are shown, and the races are omitted. It has been known to make such a roller mounting by means of a pin within the plane of rotation of the roller and having a bearing permitting angling about an axis inclined with respect to the diameter passing through the contact points of the roller with the races. In Figure 4, however, the axis about which the roller is free to tilt is inclined with respect to its plane of rotation, and this axis is rather close to the axis of rotation of the roller. In Figure 4 this axis is designated as D—D, and it is marked as E—E in Figure 5, and as F—F in Figure 6. Referring to Figure 4, the frame 212 is tiltable about the pivots 240, 240; and such tilting movement can be caused by motion imparted to parts 235, 236 which in turn may be connected to a manually operated mechanism of known design. The frame 212 carries a pin 220 which is rotatable therein for a limited angle. The limitation is brought about by a flattened portion 221 at the end of the pin 220, which cooperates with the peculiarly shaped hole 245 of the plate 241, shown in Figure 6.

The pin 220 is furthermore provided with a key-way 231. Slidable upon the pin 220 is a member 222, which is cylindrical on its outside, but with the axis of this cylindrical surface inclined with respect to its bore that fits upon the pin 220. A key 228 unites the member 222 and the pin 220 for rotation, so that the inclined axis D—D Figure 4, or F—F of Figure 6, can move over a limited angle, of about 90° in the drawings. The purpose of this arrangement is to make the device operative for both directions of rotation of the races (and consequently the rollers). The position in which the flattened end of the pin 220 is stopped by the plate 241 as shown in Figure 6 corresponds to a rotation of the roller in clockwise direction. For a rotation in the opposite direction, the flattened end 221 and the axis F—F would be moved to a position at about right angles thereto.

The member 222 is surrounded by another member 224, which has a bore slidably fitting over the outer diameter of the member 222, and inclined with respect to the outer cylindrical surface of the member 224 in the opposite direction to the inclination provided in the member 222. The arrangement is such that the outer surface of the element 224 will be coaxial with the axis of the pin 220, if the two members assume a certain position, as shown in Figure 4.

The outside of the member 224 is closely fitted in the element 216, which is the journal for the rotation of the roller 215. The element 216 is provided with shoulders 217 on each side, and the shoulder on the one side is provided with two stops, forming a slot or recess 233. A screw 242 engages this slot and together with the stops on the shoulder prevents the journal 216 from having unlimited rotation with the roller. However, the slot 233 is wide enough to permit the element 216 to rotate over an angle at least as great as the angle which is described by the flattened end 221 of the pin 220, so that the roller will upon reversal of its direction of rotation, cause by the friction in its bearing a similar reversal and limited rotational movement of the parts 216—224—222—220 until 220 is stopped from further rotation by its end 221 and the opening 245 in the plate 241.

The stop 242—233 is necessary to prevent a tendency of the journal 216 to rotate the member 224 by friction if its movement is unlimited, and thereby cause a tendency of the roller to deviate to one side of its position of equilibrium.

Both members 222 and 224 are provided on their axial ends with spherical surfaces having a common center, and both are held in their respective position by the spherical surfaces of washers 229, 229. An inspection of the drawings will show that a load upon the roller 215, acting in the direction of the axis 240, 240 would tend to move the member 222 in an axial direction along the pin 220 to one side, and the member 224 to the other side, if they were not held in position by the washers 229.

Any tilting movement of the frame will cause a relative movement between the members 222 and 224, thereby "twisting" the roller about an axis passing through the contact points of the roller with the races. This causes the roller to tilt and change the speed ratio; and the roller regains its equilibrium by movement analogous to that discussed in connection with Figures 1 to 3. In both forms, as shown in the Figures 1–3 and 4–6 it may be observed that the axis around which the roller swings, or rotates (tilts) until it reaches the new position, is passing through the center of the roller. This is not a condition necessary for the proper functioning of my device. The axis referred to may pass to either side of the center of the roller, and may even lie entirely on one side of the roller.

Figure 7:
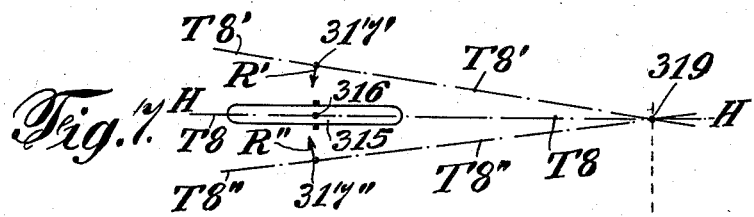
Figures 7, 8, 9 and 10 are quasi kinematic diagrams illustrating various actions of structures embodying the invention.
Figure 8:
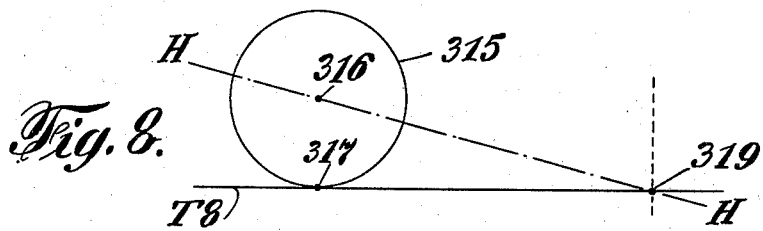

Figures 7 and 8 show diagrammatically a roller 315 of the previously known type, free to swing about an axis H—H in its plane of rotation and inclined relatively to its diameter through the contact points of the roller with the races. Only one contact point of the roller 315 with one race is shown at 317. In Figures 7 and 8 the axis H—H intersects with the tangent T8 through the contact point at 319.

The stabilization of the roller by this arrangement is shown in Figure 7. The direction of rotation of the roller is assumed to be clockwise (Fig. 8). Thus the race at point 317 moves from right to left in the figure, and the point 319 is on the approach side of the contact point. If the roller were displaced for any reason about the axis H—H round which its mounting moves, thereby moving its contact point 317 to either 317' or 317'', its tangent T8' or T8'' at the respective contact point with the race must still go through the point of intersection 319. That is, the tangents converge towards the point 319. In the displaced position the roller is no longer parallel to the movement of the race surface from right to left and at either contact point, 317' or 317'', a force R' or R'' respectively, acting perpendicular to the respective tangents T8' or T8'' will return the roller and its contact point (moving about the axis H—H) toward its neutral position, or position of equilibrium 317. It will be obvious that if the direction of movement of the raceway were reversed the forces R' R'' would be reversed and the roller instead of being returned would be forced further out of parallelism with the line of movement of the raceway. In other words the equilibrium would be unstable.

Figure 9:
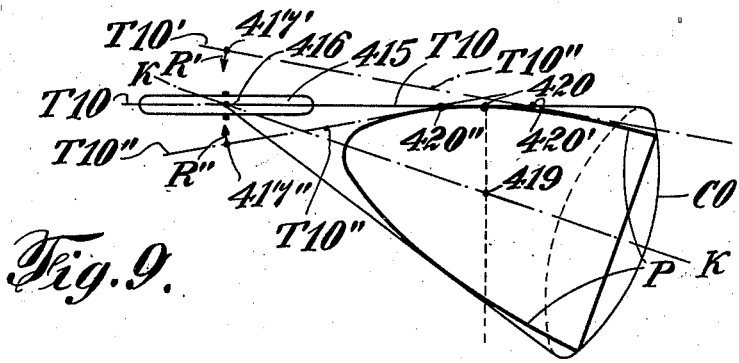
Figure 10:
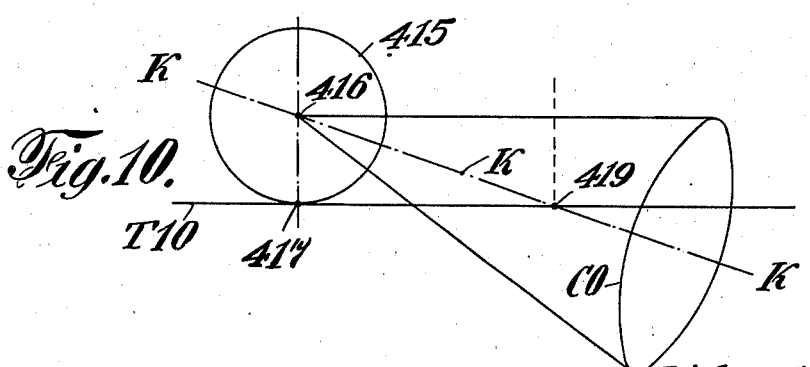

In Figure 9, the roller is shown with an axis K—K inclined with respect to its plane of rotation in accordance with the present invention, as well as being inclined relatively to its diameter through the contact point 417 with the raceway. This axis intersects a tangential plane to the roller, drawn in the contact point 417, in the point of intersection 419. But the tangent T10 to the roller does not pass through this point of intersection as the tangent T8 does in Figure 8. It will be observed, that if the roller is rotated about the axis K—K, while keeping the angle between the plane of the roller and the axis constant, the plane of the roller will envelop a cone with the vertex at 416 and the position of the roller relatively to the raceway, as well as its equilibrium, will be dependent upon the position which the tangent assumes from the contact point 417 to that cone. For relatively small angles of tilt, any change in the position of the tangent-plane at the contact point 417 will be equally small, and all tangent-planes can be represented by the tangent-plane of the original contact point.

In Figure 9 this is the plane of the paper, if the point 417 is supposed to lie in it, and the center 416 is supposed to be above it. In that case, all tangent lines from the contact points to the cone are tangents from these points to the intersection line of the cone with the plane of the paper (or original tangent-plane). This curve is a conic section, and in the case illustrated it is a parabola, indicated by P. The tangent T10 through the normal contact point 417 touches the parabola in the point 420, and this point takes the place of point 319 of Figure 7. It constitutes an instantaneous center about which the plane of the roller may be regarded as swinging if the roller is displaced about the axis K—K.

If the roller is displaced so that its contact point moves to 417' or 417'', the respective tangents are T10' and T10'', and it is clear that they will not go through the point 420, but through the points 420' and 420'' respectively. In other words, the instantaneous center of movement shifts to these positions as the movement progresses.

The tangents are still converging towards the approach side with respect to the direction of rotation, however, and the return forces R' and R'' respectively set up in the contact points 417' and 417'' will drive the roller back to its equilibrium position 417. If the axis K—K (which corresponds to the axis A—A of Figure 1) is moved in a way similar to that indicated in Figure 1 by the positions A1—A1 or A2—A2, then the intersection curve between the cone CO and the tangent-plane will move due to the movement of the cone CO and the new position of equilibrium of the roller will be that in which the tangent line through its contact point to the intersection curve will be at right angles to the radius in the contact point. Although the curve will change its form somewhat for wider angles of change in inclination, it will be quite similar for smaller changes, and it will be understood from the drawings that the roller 415, or, its contact point 417 will be forced to follow up or down (taken with respect to the drawings, which corresponds to a movement radially inward or outward with respect to the races on which the roller runs) any movement that the parabola makes whenever the position of the cone CO is changed by shifting the position of the axis K—K.

It will also be seen that the roller will be stable in its new position, as long as the tangents drawn from adjacent contact-points to the cone-intersection-curve are converging toward the advancing side, just so as has been shown for the original position 417. Since the intersection curve of the cone CO can be found by known geometrical methods, this explanation gives the means to determine whether or not the roller will be in stable equilibrium for the selected angles of the axis K—K and also means to determine in advance to what position the roller will move for a given change in the angle of the axis K—K.

It is apparent that the forms shown in this application are but a few examples of the great variety of forms in which the present invention can be embodied and carried out. The specification and description given will enable anyone skilled in the art to lay out equivalent designs, and to predetermine whether such designs will fulfill the intended purpose.

The invention comprises the broad idea to journal a roller for free (within a limited angle) rotational or swinging movement about an axis which is inclined with respect to its plane of rotation and which may or may not change such angle or inclination during operation of the device. It will be understood that the device will ordinarily be operated submerged in a suitable oil or other suitable liquid.

In compliance with the patent statutes, I have disclosed the best forms in which I have contemplated applying my invention, but it will be understood that the disclosure is illustrative and not limiting.

What is claimed is:

1. In a friction transmission comprising toric races and rollers therebetween: a carrier for said rollers; a spherical pivot for each of said rollers, such pivot being positioned on the axis of rotation of the respective roller and supporting a journal upon which the roller is freely rotatable; a pivotal joint associated with each journal; means for guiding each of said pivotal joints in a circular path and a member supported for limited rotation about the axis of the transmission, said member having equally spaced radial extensions each of which is operatively connected with one of said pivotal joints, whereby a limited movement of said member will cause the said pivotal joints to move simultaneously and each traveling an equal amount in its respective circular path.

2. In a friction transmission comprising toric races and rollers therebetween; a carrier for said rollers; a spherical pivot for each of said rollers, such pivot being positioned on the axis of rotation of the respective roller and supporting a journal upon which the roller is freely rotatable; a pivotal joint associated with each journal by a sliding connection; means forming a circular path common to all said pivotal joints; and a member supported for limited rotation about the axis of the transmission, said member having equally spaced radial extensions each of which is operatively connected with one of said pivotal joints whereby a limited movement of said member will cause the said pivotal joints to move simultaneously in their circular path without disturbing the spacing of said extensions.

3. In a friction transmission, a pair of races, a roller interposed between them, a carrier for supporting said roller, a journal for said roller to rotate freely thereon to transmit power from one race to the other, a pivotal connection between said journal and said carrier, means connected to said journal for maintaining a rocking axis for said roller inclined with respect to the plane of rotation of said roller, and means to maintain said inclined rocking axis in a predetermined position with respect to said carrier.

4. In a friction transmission; a pair of races; a roller interposed therebetween; a carrier for supporting said roller; a journal upon which said roller can freely rotate; a pivotal connection between said journal and said carrier; means connected to said journal for maintaining a rocking axis for said journal inclined with respect to the plane of rotation of the roller, means engaging the first said means for holding said rocking axis inclined with respect to a plane perpendicular to the axis of said races, said last named means including a second pivotal connection in a predetermined position with respect to said carrier, and operator operable means to change the predetermined position of said last named pivotal connection.

5. For use in a friction transmission having toric races, a roller, a carrier to support said roller, a journal for said roller to rotate thereupon, means to support said journal from said carrier, means including a portion of said supporting means whereby said journal is movable with respect to said carrier only about a geometrical axis inclined with respect to the plane of rotation of the roller, means to maintain said inclined axis in a predetermined position with respect to said carrier, and manually operable means to change the predetermined position of said inclined axis at will.

6. For use in a friction transmission having toric races, a roller, a carrier to support said roller, a journal for said roller to freely rotate thereupon, means connected to said carrier and to said journal establishing an axis inclined with respect to the plane of rotation of the roller around which axis said journal is freely rockable, and means connected to said journal for preventing radial movement of the center of said roller with respect to the axis of said transmission.

7. For use in a friction transmission of the toric race and roller type, a roller, a carrier, a journal for said roller to freely rotate thereupon, means connected to said carrier for supporting said journal, means including said first named means for limiting the movability of said journal relative to said carrier to a rocking movement about an axis inclined with respect to the plane of rotation of the roller, said journal and said last named means cooperating to maintain a predetermined angle of inclination between said rocking axis and said plane of rotation of the roller.

8. In a friction transmission having toric races, a roller, a carrier for supporting said roller, a journal upon which said roller can freely rotate, a pivotal joint connecting said journal to said carrier, a universal joint movable relatively to said journal and operatively connected to said carrier and means operatively connecting said two joints for establishing a geometrical axis passing through said two joints and inclined with respect to the plane of rotation of the roller whereby said journal can rock freely about said inclined axis.

9. In a friction transmission having toric races, a roller, and a carrier to support the same, a journal upon which said roller can freely rotate, means establishing a rocking axis for said roller, said means including one ball joint in fixed connection with respect to said journal and in fixed position with respect to said carrier, another ball joint movable in a plane perpendicular to the axis of the races, means for holding said last named ball joint in a definite position, and an element operatively connecting said last named ball joint to said journal whereby the movability of said journal is limited to a rocking movement about the axis passing through both of said ball joints.

10. In a friction transmission having toric races, a roller, a carrier for supporting said roller, a journal upon which said roller is free to rotate, two universal joints, means for supporting said journal from said two joints rockable about the geometrical axis determined by said two joints, the first said joint fixedly positioned with respect to said journal and with respect to said carrier, the second said joint being movable, and means for moving said second joint at will along an arc concentric with the axis of said races.

11. In a friction transmission, toric races, a roller therebetween, a carrier for supporting said roller, a journal upon which said roller is free to rotate, two universal joints and means for supporting said journal from said two joints rockable about the geometrical axis determined by said two joints, the first said joint being fixedly positioned with respect to said journal and to said carrier, the second said joint being movable, means forming a predetermined path with respect to said carrier along which the second said joint can be moved at will, and operator operable means for holding the second said joint in a definite position along said path.

12. In a friction transmission having a pair of races, a roller therebetween, a carrier for supporting said roller, a journal for said roller to rotate freely thereupon, two universal joints and means for supporting said journal rockable about the geometrical axis determined by said two joints, the first said joint being positioned with its center upon the axis of rotation of said roller, the second said joint being positioned remote from the axis of rotation of the roller and the two joints being positioned at different distances from the plane of rotation of the roller.

13. In a friction transmission having a pair of toric races, a roller therebetween, a carrier to support said roller, a journal for said roller to rotate thereupon, means to support said journal from said carrier including pivoting elements establishing a rocking axis for said journal inclined relatively to the plane of rotation of said roller, and means to maintain said rocking axis in a predetermined position intersecting the tangent plane of the contact point between said roller and race in a point on the approach side of said plane with respect to the direction of rotation of the respective race.

14. In a friction transmission having a pair of toric races, a roller therebetween, a carrier to support said roller, a journal for said roller to rotate thereupon, means to support said journal from said carrier including pivoting elements establishing a rocking axis for said journal inclined relatively to the plane of rotation of said roller, means to maintain said rocking axis in a position intersecting the tangent plane of the contact point between said roller and race in a point situated on the approach side of the plane with respect to the direction of rotation of the respective race and means automatically operative upon reversal of the direction of rotation of the races to shift the rocking axis to a position where the aforesaid rocking axis location also exists with the reversed rotation of the races.

RICHARD ERBAN.